(No Model.)
H. H. GORTER.
UNIVERSAL JOINT FOR COUPLING PIPES.
No. 586,176. Patented July 13, 1897.
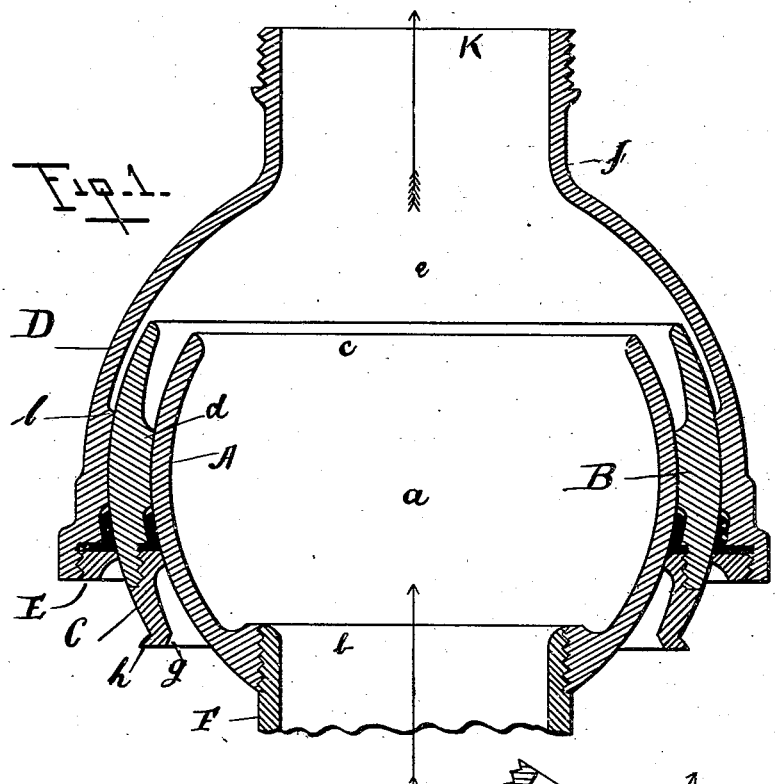
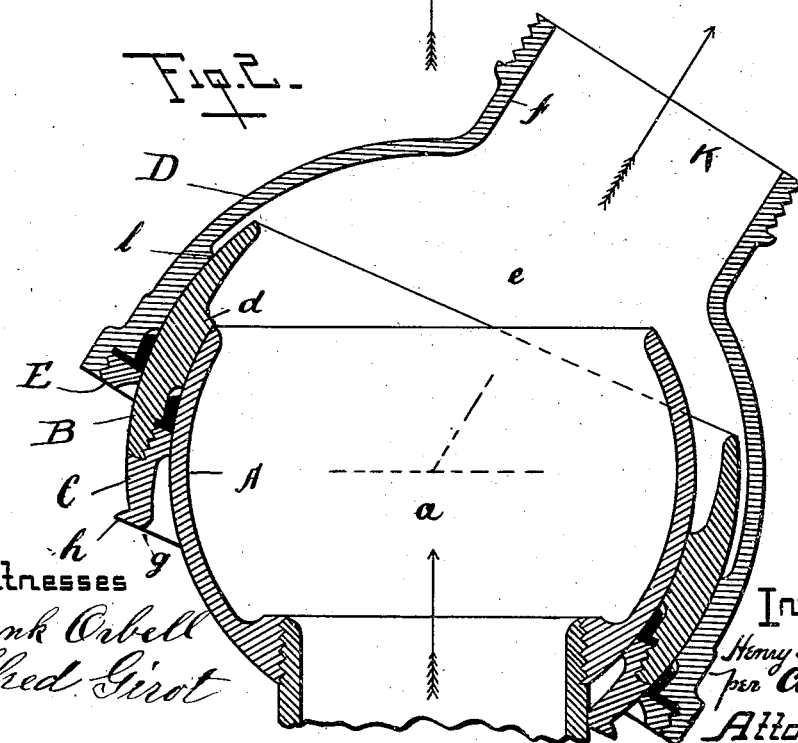
Witnesses
Frank Orbell
Alfred Girot
Inventor
Henry H. Gorter
per A. S. Paré
Attorney

UNITED STATES PATENT OFFICE.

HENRY H. GORTER, OF SAN FRANCISCO, CALIFORNIA.

UNIVERSAL JOINT FOR COUPLING PIPES.

SPECIFICATION forming part of Letters Patent No. 586,176, dated July 13, 1897.

Application filed December 11, 1895. Serial No. 571,794. (No model.)

*To all whom it may concern:*

Be it known that I, HENRY H. GORTER, a citizen of the United States, residing at the city and county of San Francisco, State of California, have invented certain new and useful Improvements in Universal Joints for Coupling Pipes; and I do hereby declare the following to be a full, clear, and exact description of said invention, such as will enable others skilled in the art to which it most nearly appertains to make, use, and practice the same.

My invention relates to an improvement in that class of "universal joints" commonly called "ball-joints" and used particularly for fire or hydraulic purposes.

It consists of an intermedial shell placed between the ball and socket sections of an ordinary ball-joint.

My object is to obtain a greater degree of spherical angle than heretofore obtained by the usual way of constructing such joints.

Referring to the accompanying drawings, which form part of the following description, Figure 1 is a sectional view of my improved ball-joint, and Fig. 2 is a similar view showing the socket-section partly inclined.

Similar letters refer to similar parts throughout the drawings.

Letter A represents the ball-section of the joint; B, the intermediate shell, provided with projecting annular coupling-bearing C, screwed to the shell to keep same within the axis of the ball, and D the socket-section, also provided with annular coupling-bearing E, screwed to the socket to keep the same within the axis of the intermedial shell.

Within the ball-section A, I form the globular chamber $a$ and openings $b$ $c$, to which the main pipe F may be connected in any suitable manner, and upon a portion of the inner face of the intermedial shell I provide beveled bearing $d$, which fits annularly over the ball-section.

The socket-section D consists of chamber $e$ and hollow neck $f$, provided with opening K, which may be connected to a discharge pipe or nozzle. A portion of the inner face of this socket is provided with beveled bearing $l$, which fits annularly over the intermedial shell. Proper packing is interposed between the equatorial portion of the bearing-surface of the intermedial shell and the socket-section, so that the joints are rendered water or steam tight, as the case may be.

The operation of my invention will be readily understood when it is desired to obtain certain angle in any direction. The ball-section A will be forced to roll in the spherical cavity of the intermedial shell until pipe F strikes the annular bearing C at its edge $g$. Then both the ball and the intermedial shell B will roll in the spherical cavity of the socket-section D until the projecting stopper $h$ of annular coupling C strikes the edge of annular coupling E of the socket-section. Thus in this position an angle of forty-five degrees can be obtained in any direction with a clear passage-way within chambers $a$ $e$.

The socket-section can be moved in the same manner if the ball-section is stationary.

By the construction above described I obtain a very useful coupling for fire and hydraulic purposes.

Having thus described my invention, what I claim as new, and desire to secure by Letters Patent of the United States, is—

1. In a universal joint, the combination, of a socket-section, a hollow ball-section within the socket-section, and an intermediate section between the ball and socket sections, and having a universal connection with the ball-section.

2. A universal joint comprising a ball-section and socket-section, provided with passage-way, an intermedial shell between the two sections having a universal connection with the ball-section and having an annular coupling-bearing screwed to the shell—as set forth and for the purposes described.

3. A joint consisting of a ball-section A, an intermedial shell, B, having a universal connection with the ball-section and provided with annular coupling-bearing C, and a socket-section D, provided with annular coupling-bearing E, and of packing interposed between the equatorial portion of the intermedial shell and the socket-section, as set forth and for the purposes described.

4. In a universal joint, the combination of a socket-section, a hollow ball-section within the socket-section, and a movable intermediate section between the ball and socket sections, said intermediate section having the projecting stopper $h$.

5. In a universal joint, the combination, of a socket-section, a perforated ball-section within the socket-section, and a zonular section movably held between the socket and ball sections.

6. In a universal joint, the combination of a socket-section, a hollow ball-section within the socket-section, an intermediate section between the ball and socket sections, and annular bearing-rings between said sections, substantially as described.

In testimony whereof I have hereunto set my hand this 5th day of December, A. D. 1895.

HENRY H. GORTER.

In presence of—
  S. S. TILTON,
  W. T. GORHAM.